Patented Dec. 17, 1935

2,024,606

UNITED STATES PATENT OFFICE 2,024,606

MERCAPTAN-AMINE DERIVATIVE AND PROCESS FOR PRODUCING IT

Lorin B. Sebrell, Cuyahoga Falls, Ohio, assignor to Wingfoot Corporation, Wilmington, Del., a corporation of Delaware No Drawing. Application April 26, 1933, Serial No. 668,079

38 Claims. (Cl. 260—44)

This invention relates to a process of reacting cyclic mercaptans and amines or ammonia and the reaction products formed thereby. More particularly, it relates to the products formed by reacting ammonia or amines of a basic nature with cyclic mercaptans in which the mercaptan group is directly connected to a carbon atom of the ring structure.

Although the reaction products herein described are particularly useful as accelerators of the vulcanization of rubber, and the present application is directed to the products themselves and the method of their manufacture, regardless of the purposes for which they are to be intended. Processes for curing rubber in the presence of these products are described in copending applications Serial Nos. 140,429, 596,145 and 657,471, filed October, 8, 1926, March 1, 1932 and February 18, 1933, respectively, of which applications, the present application is a continuation-in-part.

As a rule, the products of this invention may be formed by simple admixture of the mercaptan and the amine in solid form or of solution of the two reactants. If the compounds are brought together without first being dissolved in some solvent, the mixture is preferably heated enough to cause one of the compounds to dissolve in the other. The reaction products, spontaneously formed, appear to be simple addition products of the two compounds, the nitrogen of the amine becoming pentavalent and bonding itself to the sulphur of the mercaptan radical.

The new products and the reaction which produces them will be illustrated hereinafter by reference to specific compounds but it is to be understood that the invention is not limited to the compounds used as examples.

To illustrate one method of preparing the new compounds, n-butyl amine may be reacted with 1-mercaptobenzothiazole by separately dissolving equimolar amounts of the reactants in alcohol, preferably in as small amounts as will easily dissolve them, and mixing the resulting solutions. If desired, the solutions may be heated slightly either before or after mixing to hasten the reaction, but this is not ordinarily necessary. A short period of time is allowed for the reaction to complete itself, after which the solution is cooled. A large part of the product, n-butyl ammonium benzothiazyl mercaptide, precipitates as colorless or slightly yellow crystals melting at 110–115° C. The remainder of the product may be obtained by allowing the alcohol to evaporate. The reaction appears to be as follows:

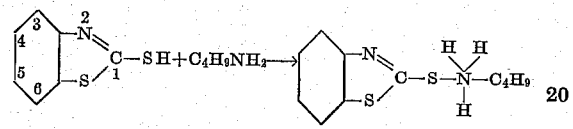

Cyclo hexyl amine and mercaptobenzothiazole may be reacted in the same manner, the reaction apparently being the following:

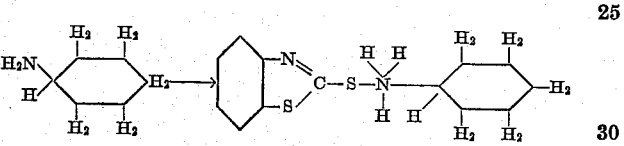

The product, cyclohexyl ammonium benzothiazyl mercaptide, crystallizes out of the alcohol solution in relatively pure form as a white crystalline substance melting at 155 to 157° C.

Another illustration is furnished by the reaction in the same manner of normal butyl amine with 1-mercapto 5-nitro benzothiazole. The product is n-butyl ammonium 5-nitro benzothiazyl mercaptide, a red crystalline substance melting at 113 to 115° C. The reaction is believed to be as follows:

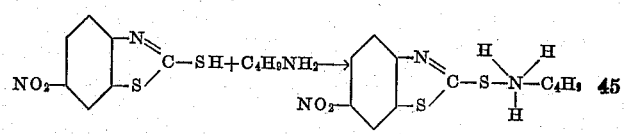

When the amine used in the reaction is a di-, tri-, or other poly-amines, a plurality of products may be formed. For example, when ethylene diamine is reacted with mercaptobenzothiazole, the mercaptobenzothiazole may add onto the ethylene diamine molecule at one end or at both ends, according to the reactions:

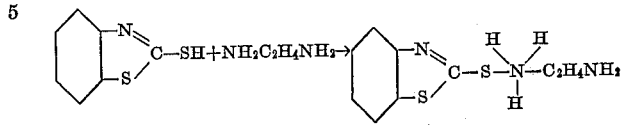

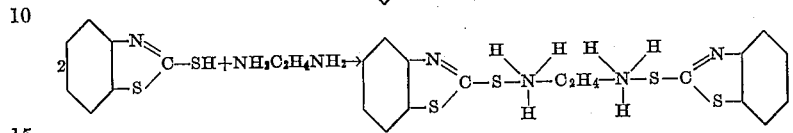

This action of ethylene diamine is typical of the poly-amines.

Of these reaction products, the unsymmetrical compound may be made by mixing equimolar proportions of diamine and mercaptobenzothiazole and heating the mixture until the mercaptobenzothiazole dissolves in the diamine. Where ethylene diamine is used, the product, consisting mainly of beta amino ethyl ammonium benzothiazyl mercaptide, melts at approximately 134° C. and is crystalline and colorless when pure. By employing two molecules of mercaptobenzothiazole to one molecule of diamine, the symmetrical product is formed. The latter, where ethylene diamine is used, is mainly ethylene bis (ammonium benzothiazyl mercaptide).

Instead of using an alkylene diamine, an arylene diamine such as para phenylene diamine may be used. This compound may be reacted with mercaptobenzothiazole by dissolving equimolar quantities of the thiazole and the diamine in separate portions of hot alcohol and mixing the two solutions at a temperature slightly below boiling. The addition product, p-amino phenyl ammonium benzothiazyl mercaptide, precipitates upon cooling as colorless or white crystals which melt at 155–157° C. A product containing two molecules of mercaptobenzothiazole to one of phenylene diamine may be prepared in a similar manner.

Dibutyl ethylene diamine, which, it will be noted, is a secondary amine as well as a diamine, likewise is included within the reactants which may be employed in the practice of the invention. Reaction with the mercaptans may be caused to occur under the same conditions as the reaction of p-phenylene diamine and mercaptobenzothiazole. With mercaptobenzothiazole, for instance, varying the proportions of the reactants gives either beta (n-butyl amino) ethyl n-butyl ammonium benzothiazyl mercaptide or ethylene=N=N' bis (N=butyl ammonium benzothiazyl mercaptide).

Other examples of the products of the present invention are found in the compounds obtained by the reaction of mercaptobenzothiazole with a mixture of compounds which may be described as ethylene poly-amines. The compounds are formed as the result of side reactions when ethylene dichloride is reacted with ammonia in the process of forming ethylene diamine. They are poly-amines, probably for the most part triethylene triamine, diethylene triamine and triethylene tetramine. They have a boiling range between 200 and 275° C. and an average molecular weight roughly estimated at 125. By mixing these compounds with mercaptobenzothiazole and heating slightly, a mixture of the new addition products is formed.

A slightly different method of reacting the compounds involves adding an alkaline solution of the cyclic mercaptan to an acid solution of the amine. This method, which may be employed to particular advantage when it is desired to obtain the reaction product in water solution, is illustrated by the mixing of an aqueous solution of a hydrochloride of butyl amine with an aqueous solution of the sodium salt of mercaptobenzothiazole, equimolar amounts of the reactants being used. The product, butyl ammonium benzothiazyl mercaptide, may be separated from the liquid by evaporating a part of the water, concentrating the solution to the point at which the product precipitates in colorless or slightly yellow crystals.

Ammonium benzothiazyl mercaptide may be prepared by the treatment at room temperature of a suspension of 20 grams of 1-mercaptobenzothiazole in 100 cc. of 95% alcohol with dry gaseous ammonia. The mercaptobenzothiazole goes into solution with the evolution of heat, after which the resulting solution may be decanted from the small amount of insoluble impurities present and evaporated, as by heating, to approximately 50 cc., a stream of ammonia being meanwhile passed through the mass. The addition of the ammonia may be continued as the solution is cooled to approximately 35 degrees C., whereupon the flask is quickly stoppered and allowed to stand overnight. The solution on standing goes over to a crystalline slurry which, after being washed with ether and dried in a stream of ammonia, melts in a sealed tube in the neighborhood of 140–145 degrees C. By titration with methyl red, 1.319 grams of the product require 14.0 cc. of 0.5 N. acid, indicating an ammonium benzothiazyl mercaptide content of approximately 97.6%. The compound may also be prepared, in an entirely similar manner, in anhydrous ether solution. The reaction proceeds as follows:

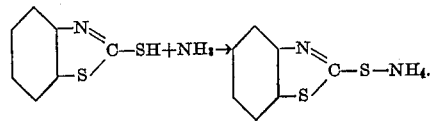

Mercaptobenzothiazole has been used for purposes of illustration in a number of the examples heretofore given, but it is to be understood that it is illustrative merely and that numerous other compounds in which a mercaptan radical is directly attached to a carbon atom of a ring structure may be used. In such compounds, the mercaptan radical has an acidic reaction without being a part of a substituted carboxylic acid group as it is when the mercaptan group is included in a thio-or dithio- or xanthic acid. Compounds containing the mercaptan radical in a substituted carboxylic acid grouping are not included within the scope of this invention. Likewise, mercaptans which react like alcohols, such as the aliphatic mercaptans, are not included for the reason that they generally do not react with amines.

Examples of cyclic mercaptans the use of which falls within the scope of this invention are the thio phenols such as thio phenol, thio cresol, thio xylenol, amino thio phenol, thio naphthol, amino thio naphthol and chlor thio naphthol. Others are the mercaptothiazoles such as 1-mercaptothiazole, butyl mercaptothiazole, 1-mercapto 3-phenyl thiazole, 1-mercaptobenzothiazole, 5-nitro mercaptobenzothiazole, 5-amino mercaptobenzothiazole, 4- or 5-chlor-mercaptobenzothiazole, 1-mercapto naphthothiazoles, 5-methyl mercaptobenzothiazole, 1-mercapto 3-phenyl benzothiazole, mercapto tolyl thiazoles and other ring substituted nitro-, amino-, halogen-, alkyl- and aryl-mercapto arylene thiazones. Still others are the mercapto oxazoles such as mercaptobenzoxazole and mercaptonaphthoxazole and the mercapto thiazines.

Practically any amine having a sufficiently basic reaction will react with the cyclic mercaptans of this invention. The invention, however, does not extend to the reaction products with the mercaptans of the amides and amidines, of which urea and diphenylguanidine are examples. These compounds are not true amines and hence are not regarded as falling within the scope of this invention.

Examples of amines which may be used in the practice of this invention are the simple aliphatic amines such as ethyl amine, propyl amine, n-butylamine, isobutyl amine, isoamyl amine, heptyl amine, amino cyclohexyl ethyl ether, cyclo hexyl amine, and other cyclo paraffinic amines. The secondary and tertiary aliphatic amines such as diethyl amine, dipropyl amine, dibutyl amine, tripropyl amine and tributyl amine also react with mercaptans. The alkyl aryl amines such as ethyl aniline and butyl naphthylamine are also included within the scope of the invention.

Of the poly amines which will react according to this invention, examples are diamines such as ethylene diamine, propylene diamine, butylene diamine, dibutyl ethylene diamine, dibutyl propylene diamine, diphenyl butylene diamine, dicyclohexyl ethylene diamine, diamino cyclohexane, p-phenylene diamine, dimethyl phenylene diamine, m-toluylene diamine, benzidine, tolidine and naphthalene diamine. Also within this group are the amines containing more than two amino groups such as diethylene triamine, triethylene tetramine, diamino diethyl amine, diamino dipropyl amine, diamino ethyl propyl amine, and diamino diphenylamine. A sub-group of the poly amines which have been found to react satisfactorily are the poly primary amines containing at least two primary amino groups.

Additional examples of the reaction products of this invention are the equimolar reaction products of mercaptobenzothiazole and diethyl amine, which melts at 134° C.; mercaptobenzothiazole and dipropyl amine, which melts at 127° C.; mercaptobenzothiazole and dibutyl amine, which melts at 71° C.; thio phenol and diethyl amine, which melts at 60° C.; and thio phenol and dibutyl amine, which melts at 76° C. Still others are ethyl cyclohexyl ammonium benzothiazyl mercaptide melting at 133° C.; dicyclohexyl ammonium benzothiazyl mercaptide melting at 172° C.; and methyl cyclohexyl ammonium 5-amino benzothiazyl mercaptide.

It is to be understood that the compounds named are but illustrative of the type of compounds which will react according to the process of this invention and that other compounds of the types described may be used in their stead.

In addition, many minor variations may be made in the process of preparing these new reaction products to adapt the process to the preparation of specific compounds. These modifications will be within the skill of the average chemist and are within the scope of this invention. It is intended that the patent shall cover, by suitable expression in the appended claims, whatever features of patentable novelty reside in the invention.

What I claim is:

1. A mercaptan derivative which is a reaction product of a mercapto thiazole and a compound selected from the group consisting of ammonia and the amines.

2. A mercaptan derivative which is a reaction product of a mercapto aryl thiazole and a compound selected from the group consisting of ammonia and the amines.

3. Ammonium benzothiazyl mercaptide.

4. A mercaptan derivative which is a reaction product of a mercapto benzothiazole and a compound selected from the group consisting of ammonia and the amines.

5. As a new product, a mercaptan derivative comprising a reaction product of a poly amino-substituted hydrocarbon and 1-mercaptobenzothiazole.

6. An aliphatic ammonium thiazyl mercaptide in which the ammonium group includes a nitrogen atom having directly attached thereto not less than two hydrogen atoms.

7. An aliphatic ammonium benzothiazyl mercaptide in which the ammonium group includes a nitrogen atom having directly attached thereto not less than two hydrogen atoms.

8. An ammonium benzothiazyl mercaptide in which the nitrogen atom of the ammonium group is alkyl substituted.

9. As a new product, a mercaptan derivative which is a reaction product of a mercaptothiazole and a primary aliphatic amine.

10. As a new product, a mercaptan derivative which is a reaction product of a mercapto aryl thiazole and a fully saturated hydrocarbon-substituted amine.

11. An ammonium benzothiazyl mercaptide.

12. An ammonium benzothiazyl mercaptide in which the ammonium group is saturated.

13. The process of preparing an ammonium benzothiazyl mercaptide which comprises reacting 1-mercaptobenzothiazole with a fully saturated organic base.

14. The reaction product of a 1-mercaptobenzothiazole and ammonia.

15. An ammonium thiazyl mercaptide.

16. Compounds of the formula

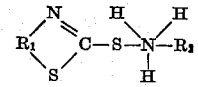

wherein $R_1$ and $R_2$ are respectively a radical of the benzene and naphthalene series and an aliphatic radical.

17. Compounds of the formula

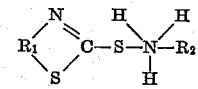

wherein $R_1$ and $R_2$ are respectively a phenylene radical and an aliphatic radical.

18. Compounds of the formula

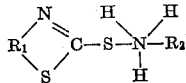

wherein $R_1$ is a phenylene radical and $R_2$ is a hydrocarbon.

19. As a new product, a mercaptan derivative which is a reaction product of a poly amino-substituted hydrocarbon and a mercapto aryl thiazole of the benzene and naphthalene series.

20. As a new product, a mercaptan derivative which is a reaction product of an amino-substituted hydrocarbon and a mercapto aryl thiazole of the benzene and naphthalene series.

21. As a new product, a mercaptan derivative which is a reaction product of a saturated organic amine with 1-mercaptobenzothiazole.

22. As a new product, a mercaptan derivative which is a reaction product of 1-mercaptobenzothiazole and a fully saturated hydrocarbon-substituted amine.

23. The process of preparing an N-hydrocarbon ammonium aryl thiazyl mercaptide which comprises reacting a mercapto aryl thiazole with a poly amino-substituted hydrocarbon.

24. The process of preparing an N-hydrocarbon ammonium benzothiazyl mercaptide which comprises reacting 1-mercaptobenzothiazole with a primary amino-substituted hydrocarbon.

25. The process of preparing an aliphatic ammonium aryl thiazyl mercaptide which comprises reacting a mercapto aryl thiazole with an aliphatic amine.

26. The process of preparing an aliphatic ammonium benzothiazyl mercaptide which comprises reacting 1-mercaptobenzothiazole with an aliphatic amine.

27. The process of preparing an ammonium aryl thiazyl mercaptide which comprises reacting a mercapto aryl thiazole with a fully saturated organic base.

28. The process of preparing an ammonium benzo-thiazyl mercaptide which comprises reacting a mercapto benzo thiazole with a fully saturated organic base.

29. The process of preparing an N-hydrocarbon ammonium thiazyl mercaptide which comprises reacting a mercapto thiazole with an amino-substituted hydrocarbon.

30. The process of preparing an aliphatic ammonium benzo thiazyl mercaptide which comprises reacting a mercapto benzo thiazole with a secondary aliphatic amine.

31. As a new product, a mercaptan derivative which is a reaction product of an aliphatic amine and a benzothiazyl mercaptan.

32. As a new product, a mercaptan derivative which is a reaction product of a secondary aliphatic amine and a mercapto aryl thiazole of the benzene and naphthalene series.

33. As a new product, a mercaptan derivative which is a reaction product of a primary aliphatic amine and 1-mercaptobenzothiazole.

34. The process of preparing an ammonium thiazyl mercaptide which comprises reacting a mercapto thiazole with a compound selected from the group consisting of ammonia and the amines.

35. A mercaptan derivative which is a reaction product of mercapto benzothiazole and a basic amine.

36. As a new product, a mercaptan derivative which is a reaction product of a poly amino-substituted hydrocarbon and a mercapto benzo thiazole.

37. As a new product, a mercaptan derivative which is a reaction product of an amino-substituted hydrocarbon and a mercapto thiazole.

38. As a new product, a mercaptan derivative which is a reaction product of a mercapto aryl thiazole and a fully saturated hydrocarbon-substituted amine, said aryl group being selected from the benzene and naphthalene series.

LORIN B. SEBRELL.